(12) United States Patent
Abraham et al.

(10) Patent No.: US 6,207,752 B1
(45) Date of Patent: Mar. 27, 2001

(54) THERMOPLASTIC VULCANIZATES OF CARBOXYLATED NITRILE RUBBER AND THERMOPLASTIC POLYURETHANES

(75) Inventors: Tonson Abraham, Strongsville; Sabet Abdou-Sabet, Akron, both of OH (US); Trazollah Ouhadi, Liege (BE); Norman Barber, Norwalk, OH (US)

(73) Assignee: Advanced Elastomer Systems LP, Akron, OH (US)

( * ) Notice: Subject to any disclaimer, the term of this patent is extended or adjusted under 35 U.S.C. 154(b) by 0 days.

(21) Appl. No.: 09/443,216

(22) Filed: Nov. 19, 1999

Related U.S. Application Data

(63) Continuation-in-part of application No. 08/987,961, filed on Dec. 10, 1997, now Pat. No. 6,020,427.

(51) Int. Cl.$^7$ .............................. C08L 9/02; C08L 13/00; C08L 75/04
(52) U.S. Cl. .................. 525/67; 525/92 C; 525/125; 525/131
(58) Field of Search .......................... 525/67, 125, 131, 525/92 C

(56) References Cited

U.S. PATENT DOCUMENTS

| | | |
|---|---|---|
| 4,141,863 | 2/1979 | Coran et al. . |
| 4,226,953 | 10/1980 | Coran et al. . |
| 4,666,972 | 5/1987 | Kohler et al. . |
| 4,806,588 | 2/1989 | Fujimoto et al. . |
| 5,100,947 | 3/1992 | Puydak et al. . |
| 5,142,001 | 8/1992 | Yasuda et al. . |
| 5,157,081 | 10/1992 | Puydak et al. . |
| 5,376,723 | 12/1994 | Vogt et al. . |
| 5,397,839 | 3/1995 | Patel . |
| 5,550,190 | 8/1996 | Hasegawa et al. . |
| 5,637,407 | 6/1997 | Hert et al. . |
| 5,739,252 | 4/1998 | Kirchmeyer et al. . |
| 5,760,158 | 6/1998 | Schroeter . |
| 5,905,133 | 5/1999 | Muller et al. . |
| 5,908,894 | 6/1999 | Genz et al. . |

OTHER PUBLICATIONS

An article entitled "Toughened Pol(butylene terephthalate)s and Blends Prepared by Simultaneous Chain Extension, Interfacial Coupling, and Dynamic Vulcanization Using Oxazoline Intermediates" Christof Worner, Philipp Muller, Rolf Mulhaupt, Freiburger Materialforschungszentrum and Institut for Makromolekulare Chemie, Stefan–Meier–Str. 21, D–79104, Freiburg i., Br., Germany, pp. 633–642, published Oct. 1–6, 1997.

*Primary Examiner*—Patricia A. Short
(74) *Attorney, Agent, or Firm*—William A. Skinner; Daniel J. Hudak

(57) ABSTRACT

Low oil swell, non sticky readily processable carboxylated nitrile rubber-thermoplastic polyurethane vulcanizate compositions have increased upper service temperature over comparable thermoplastic polyurethanes. The compositions of the present invention are made utilizing a processing aid, for example, maleated polyolefins and addition type curing agents such as bisoxazolines or bisimidazolines. The compositions generally contain thermoplastic polyurethane as a continuous phase with the carboxylated nitrile rubber being dispersed therein.

16 Claims, No Drawings

THERMOPLASTIC VULCANIZATES OF CARBOXYLATED NITRILE RUBBER AND THERMOPLASTIC POLYURETHANES

CROSS REFERENCE

This application is a continuation-in-part of U.S. Ser. No. 08/987,961, filed on Dec. 10, 1997, now U.S. Pat. No. 6,020,427.

FIELD OF INVENTION

The present invention relates to thermoplastic vulcanizates (TPVs) containing thermoplastic polyurethane and small particles of cured nitrile rubber dispersed therein. The present invention further contains addition type curing aids, which enhance processability and will not affect or breakdown the thermoplastic phase.

BACKGROUND OF THE INVENTION

Heretofore, many types of thermoplastic vulcanizates were known. More specifically, U.S. Pat. No. 4,226,953 to Coran and Patel relates to thermoplastic compositions comprising blends of styrene-acrylonitrile (SAN) resin and nitrile rubber of high gel content.

U.S. Pat. No. 4,141,863 to Coran et al. relates to a thermoplastic composition comprising blends of cross-linked rubber and thermoplastic linear crystalline polyester using thermoplastic polyesters having a softening point above 50° C. Rubbers include natural or synthetic diene rubber polyurethane rubber and nitrile rubber. The blends may also contain plasticizers.

U.S. Pat. No. 4,666,972 relates to polyalkylene terephthalates which contain a fluorinated polyolefin in addition to a polymer having a glass transition temperature of less than −30° C.

U.S. Pat. No. 5,397,839 relates to elastomeric compositions having improved heat aging properties provided by blends of thermoplastic polyester resin and hydrogenated nitrile rubber. The rubber component of the composition is at least partially cured.

U.S. Pat. No. 5,550,190 to Hasegawa et al. relates to a thermoplastic elastomer composition obtained by dynamically crosslinking (A) 51–95% by weight of a thermoplastic polyester-ether elastomer and (B) 49–5% by weight of a rubber during kneading.

U.S. Pat. No. 5,637,407 to Hert et al. relates to a composite including a rubber/thermoplastic blend adherent by itself to a thermoplastic material; the blend is in the form of a thermoplastic matrix containing rubber nodules functionalized and vulcanized during the mixing with the thermoplastic. Composite articles are obtained by overmoulding the vulcanized rubber/thermoplastic blend onto the thermoplastic.

U.S. Pat. No. 5,376,723 to Vogt et al. relates to a thermoplastic polymer blend of polyurethane and nitrile rubber having a Shore A hardness of about 55 to 70. The thermoplastic polyurethane component includes at least about 50 weight percent (wt. %) polyisocyanate; the nitrile rubber component includes about 34 mole percent (mol %) acrylonitrile; and, the ratio between the thermoplastic polyurethane component and the nitrile rubber component is about 30:70 to 40:60 volume percentage (vol. %). A peroxide crosslinking agent for the nitrile rubber may be mixed into the TPU/nitrile rubber blend.

SUMMARY OF INVENTION

The thermoplastic vulcanizate compositions (TPV) of the present invention provide advantages over the currently available TPVs by offering improved melt processability by providing product melt phase degassing, improved processability due to the decreased tendency of the product melt to adhere to metal, improved physical properties using the curatives of this invention, and increased upper service temperatures. Generally, the TPVs of the present invention have a continuous phase of a thermoplastic polyurethane having a molecular weight sufficient to be considered an engineering plastic and a carboxylated nitrile rubber phase generally in the form of particles made from acrylonitrile and a major amount of one or more conjugated diene monomers with butadiene or isoprene being preferred. The nitrile rubber phase is cured via the bound acid functionality present, using addition type curing agents such as oxazoline, which avoids the generation of undesirable volatiles which can breakdown the TPU (thermoplastic polyurethane) continuous plastic phase and cause processing problems due to entrapment of gases in the viscous polymer melt. As a result of inertness towards the molten TPU, the unique curatives of this invention allow the preparation of TPVs with enhanced properties over the corresponding simple rubber and plastic blends, which are not attainable by the use of conventional nitrile rubber cure systems, such as peroxides or resole type phenolic resins. Practice of this invention allows the preparation of TPU containing products with improved processability over conventional TPUs due to the ready degassability of the molten material of this invention, and also due to the greatly reduced stickiness of the molten TPV to metal. Stickiness to metal of the molten products of this invention can be further reduced by the addition of maleated hydrocarbon polymers to the desired TPV composition (TPU/carboxylated NBR) either prior to or subsequent to dynamic vulcanization. The TPVs of the present invention offer increased upper service temperature over comparable thermoplastic polyurethanes. The various components are dynamically vulcanized at a temperature above the melting point of the thermoplastic or the thermoplastic elastomer.

DETAILED DESCRIPTION

The thermoplastic polymers are desirably polar, crystalline, and have high melting points. The melting point of the thermoplastic polymers is desirably at least 170° C., desirably at least 200° C. and preferably at least 220° C. Excessively high melt temperatures are avoided inasmuch as during melt mixing of the thermoplastic with the carboxylated nitrile rubber, the high melt temperature will degrade the nitrile rubber. Accordingly, the thermoplastic generally has a high melting point below 260° C., and more desirably below 240° C. Suitable thermoplastic polymers include polyesters, polycarbonates, block copolymers of polyester, and the like.

Polyesters are condensation polymers. The various polyesters can be either aromatic or aliphatic or combinations thereof and are generally directly or indirectly derived from the reactions of diols such as glycols having a total of from 2 to 6 carbon atoms and desirably from about 2 to about 4 carbon atoms with aliphatic acids having a total of from about 2 to about 20 carbon atoms and desirably from about 3 to about 15 carbon atoms or aromatic acids having a total of from about 8 to about 15 carbon atoms. Generally, aromatic polyesters are preferred such as polyethyleneterephthalate (PET), polytrimethyleneterephthalate (PTT), polybutyleneterephthalate (PBT), polyethyleneisophthalate, and polybutylenenapthalate.

Various polycarbonates can also be utilized and the same are esters of carbonic acid. A suitable polycarbonate is that based on bisphenol A, e.g., poly(carbonyldioxy-1,4-phenyleneisopropylidene-1,4-phenylene).

Suitable polyester block copolymers include segmented polyester-polyether and the like. These block copolymers contain at least one block of a polyester and at least one rubbery block such as a polyether derived from glycols having from 2 to 6 carbon atoms, e.g., polyethylene glycol, or from alkylene oxides having from 2 to 6 carbon atoms. A preferred block polyester-polyether polymer is polybutyleneterephthalate-b-polytetramethylene glycol which is available as Hytrel from DuPont.

The molecular weight of the various thermoplastic resins is such that it is a suitable engineering plastic. Accordingly, the weight averages molecular weight of the various polyesters generally range from about 40,000 to above 110,000 with from about 50,000 to about 100,000 being preferred.

The rubber phase of the thermoplastic vulcanizate composition of the present invention comprises carboxylated nitrile rubber. Such rubber desirably has a small particle size below 50 microns and preferably from about 1 to 10 microns to yield good physical properties and processing characteristics. Nitrile rubbers are generally derived from conjugated dienes having from 4 to 8 carbon atoms with isoprene being desired and butadiene being preferred, and from acrylonitrile. The amount of the conjugated diene content within the copolymer is generally a majority, that is, from about 50 to about 80 percent by weight, and desirably from about 60 to about 75 percent by weight. The acrylonitrile content of the copolymer is thus the corresponding minority amount, i.e., from about 20 percent to about 50 percent by weight and preferably from about 25 to about 40 percent by weight. The actual amount of acrylonitrile will vary depending upon end use application since increased amounts of acrylonitrile improve oil resistance, tensile strength, hardness and abrasion resistance. However, increased amounts of acrylonitrile in nitrile rubber will adversely affect the low temperature properties.

The nitrile rubbers utilized in the present invention contain pendant carboxyl groups thereon such as those derived from unsaturated acids, for example, acrylic acid, methacrylic acid, and the like. The amount of carboxylic acid monomer copolymerized in the nitrile rubber is generally from about 1 to about 10 parts by weight and preferably from about 3 to about 7 parts by weight based upon 100 parts by weight of the nitrile rubber derived from acrylonitrile and the conjugated diene monomers. Upon cure, the carboxylated nitrile rubber can be cross-linked via the unsaturation present in the copolymer, or alternatively via the pendent carboxylic acid groups.

The amount of the nitrile rubber utilized in the present invention generally ranges from about 50 to about 400 parts by weight, desirably from about 200 to about 375 parts by weight, and preferably from about 5 230 to about 360 parts by weight for every 100 parts by weight of the one or more thermoplastic polymers.

Heretofore, polar thermoplastic vulcanizate compositions containing carboxylated nitrile rubber in absence of a processing aid generally formed a powder during processing, such as at a 1 to 3 plastic to rubber ratio. It has now been unexpectedly found that when a processing aid is added to the composition during mixing and before curing, substantial improvement in processability results. For example, powder formation is prevented and the product obtained is a processable thermoplastic material. It is also noted that bisoxazoline grafting of the plastic polymer onto the rubber via the end groups of the plastic and the carboxylic acid cure sites in the rubber may occur during TPV formation. This compatibilizing agent that can be formed in situ would also contribute to TPV mechanical properties.

The processing aids, which further act as a bulk compatibilizing agent, is generally a hydrocarbon polymer and optionally but preferably such polymers which have functional groups thereon, e.g., preferably pendant therefrom. Such hydrocarbon polymers include polyolefins derived from $C_2$ to $C_8$ monomers such as polyethylene or polypropylene. Another class of processing aids is the various copolymers of olefins with an unsaturated acid having a total of from 3 to about 10 carbon atoms such as maleic acid, acrylic acid, and the like with a suitable copolymer being poly(ethylene-acrylic acid). Ethylene-vinyl alcohol or ethylene vinyl acetate copolymers and the like are also suitable processing aids. Still another class of processing aids are various hydrocarbon based rubbers such as ethylene-propylene copolymers, ethylene-propylene-diene copolymers (i.e., EPDM), and the like. A still further class are various hydrocarbon block copolymers such as styrene-butadiene-styrene (e.g., the various Kraton® grades manufactured by Shell), styrene-ethylene-butene-styrene block copolymers, and the like.

The functional group of the processing aid can generally include any group which can react with the polar group of the thermoplastic resin, or the carboxylated nitrile rubber, or the curatives set forth herein below. Such functional groups include hydroxyl groups, as in an ethylene-vinyl alcohol copolymer, with acid groups or anhydride groups being preferred. The acid groups are generally obtained from unsaturated acids having from 3 to 10 carbon atoms such as acrylic acid, methacrylic acid, maleic acid, fumaric acid, and the like. The anhydrides include the various anhydrides of the above acids with maleic anhydride being preferred. The amount of the entire functional compound is generally from about 0.2 to about 6 or 10 percent by weight of the total weight of the above-noted processing aids.

Preferred processing aids which also act as compatibilizing aids include maleated polyethylene, maleated polypropylene, an ethylene-acrylic acid copolymer, maleated styrene-ethylene-butene-styrene-block copolymers, maleated styrene-butadiene-styrene block copolymers, maleated ethylene-propylene rubber, blends and cured blends of polypropylene or polyethylene and EPDM rubber (e.g., Santoprene® having a hardness of from about 35 Shore A to about 50 Shore D), and the like. Maleated polyethylene, maleated ethylene-propylene rubber and maleated styrene-butadiene-styrene block copolymers are highly preferred.

The amount of the processing and/or compatibilizing aids generally range from about 3 parts to about 30 parts by weight and preferably from about 5 parts to about 20 parts by weight based upon 100 parts by weight of the thermoplastic resin.

The utilization of the processing aids with the carboxyl containing nitrile rubbers results, after dynamic vulcanization, in the formation of a highly compatible blend wherein the thermoplastic or thermoplastic elastomer generally constitutes a continuous phase and the rubber particles constitute a discontinuous phase. However, other possible morphologies may exist.

Another important aspect of the present invention is the utilization of addition type curatives which, do not break down the plastic phase and do not form volatile compounds such as water. While other curing agents can be utilized such as free radical generating compounds, the same are not desired and thus used in small amounts such as generally less than 1.0 parts by weight and desirably less than 0.5 parts by weight based upon 100 parts by weight of the carboxylated nitrile rubber. A highly preferred addition curative or cross-linking agent is the various oxazolines or oxazines such as those having the formula

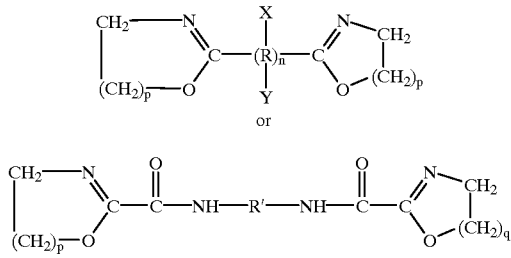

or wherein R or R' is an aliphatic or aromatic hydrocarbon group such as alkylene or arylene having 1 to 24 carbon atoms optionally substituted with one or more alkyl groups having 1 to 6 carbon atoms or substituted with an aryl group having 6 to 9 carbon atoms; n is 0 or 1, when n equals 1 then X and Y are hydrogen atoms or independently an 2-oxazoline group or a 1,3-oxazine group, or a 2-oxazoline group or a 1,3-oxazine group and a hydrogen atom, with the remaining carbon atoms having hydrogen atoms thereon, p and q, independently, is 1 or 2, and when n equals 0 then R, X, and Y are nonexistent. Further, each oxazoline group of the above formula may optionally be substituted with an alkyl of 1 to 6 carbon atoms. Further descriptions of said polyvalent oxazolines are set forth in U.S. Pat. No. 4,806,588, herein incorporated by reference. Preferred oxazolines include 2,2'-bis(oxazoline-2), 2,2'hexamethylenedicarbamoylbis(oxazoline-2), and 1,3-phenylene-2,2'bis(oxazoline-2).

Various bismaleimides as well as phenolic resins can also be used as curatives. Examples of bismaleimides include a bismaleimide based on methylene dianiline (e.g., Matrimid 5292A from Ciba-Geigy), a bismaleimide based on toluene diamine (e.g., HVA-2 from DuPont), and the like. The phenolic curing agents are well known to the art and literature and include polymers obtained by the polymerization of phenol with formaldehyde. The polymerization rate is pH dependent, with the highest reaction rates occurring at both high and low pH. A more detailed description of the preparation of phenolic resins is set forth in "Principles of Polymerization" $3^{rd}$ Edition, George Odian, pages 125–131, John Wiley Sons, Inc., N.Y., N.Y., 1991, which is hereby fully incorporated by reference. Examples of specific phenolic resins include

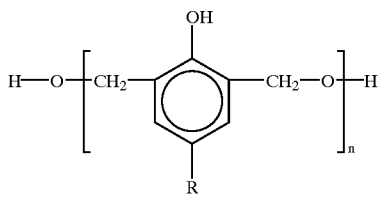

such as SP-1045 where R is isooctyl and n is 1 to 12, and HRJ-1367 where R is t-butyl and n is from 1 to 10, from Schenectedy Chemicals.

Other addition type curatives can be utilized including various isocyanates such as 1,4-phenylenediisocyanate, isophorone diisocyanate, and α, ω-isocyanate terminated polymers; various carbodiimides such as poly (triisopropylphenylene carbodiimide) i.e., Stabaxol-P from Rhein Chemie, and the like, as well as various bisimidazolines.

The multifunctional imidazolines have the formula

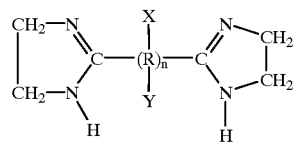

where R and n are defined as above for the multifunctional (polyvalent) oxazolines and X and Y, are a hydrogen atom, or, independently, an imidazoline group, or an imadazoline group and an hydrogen atom. A preferred multifunctional imidazoline is bismidazoline.

Still another group of addition type curatives are the various multifunctional epoxides such as the various Shell Epon® resins, epoxidized vegetable oils, tris(2,3-epoxypropyl)isocyanate, and 4,4'-methylene bis(N,N-diglycidylaniline), and multifunctional aziridines.

The amount of the curative is generally from about 1 to 12, desirably from 2 to 10, and preferably from about 2.5 to about 7 parts by weight for every 100 parts by weight of the carboxylated nitrile rubber. The addition curatives effect cross-linking by reacting with the carboxylic acid groups present in the nitrile rubber or double bonds of the diene hydrocarbon portion derived from the diene monomer. The amount of curatives used results in at least a partially cured nitrile rubber and preferably a fully or completely vulcanized nitrile rubber.

The terms "fully vulcanized" and "completely vulcanized" as used in the specification and claims means that the rubber component to be vulcanized has been cured to a state in which the elastomeric properties of the cross-linked rubber are similar to those of the rubber in its conventional vulcanized state, apart from the thermoplastic vulcanizate composition, or as indicated by no more change in tensile strength. The degree of cure can be described in terms of gel content or, conversely, extractable components. Alternatively, the degree of cure may be expressed in terms of cross-link density. All of these descriptions are well known in the art, for example, in U.S. Pat. Nos. 5,100,947 and 5,157,081, both of which are fully incorporated herein by this reference. By the term "partially vulcanized" (i.e., degree of cure), it is meant that about 30 percent or less and desirably about 10 percent or less by weight of a carboxylated nitrile rubber is soluble in methyl ethyl ketone at 80° C. By the term "fully vulcanized" (i.e., degree of cure), it is meant that about 5 percent or less of the cured carboxylated nitrile rubber is soluble in a methyl ethyl ketone at 80° C.

In addition to the thermoplastic resin, nitrile rubber, the processing aid, and the curative, the compositions of the present invention can include various conventional additives such as reinforcing and non-reinforcing fillers, extenders, antioxidants, stabilizers, rubber processing oil, extender oils, lubricants, plasticizers, anti-blocking agents, anti-static agents, waxes, foaming agents, pigments, flame retardants and other processing aids known in the rubber compounding art. Such additives can comprise up to about 60 weight percent of the total composition, and can be in the plastic phase, the rubber phase or both. Fillers and extenders which can be utilized include conventional inorganics such as calcium carbonate, clays, silica, talc, titanium dioxide, carbon black, and the like. The rubber processing oils generally are paraffinic, naphthenic or aromatic oils derived from petroleum fractions. The type will be that ordinarily used in conjunction with the specific rubber or rubbers present in the compositions, and the quantity based on the total rubber content may range from zero to about 100 phr and preferably from about 10 to about 40 phr.

Partial or preferably complete cross-linking can be achieved by adding one or more of the above-noted rubber curatives to the blend of a thermoplastic or the thermoplastic elastomer and rubber and vulcanizing the rubber to the desired degree under conventional vulcanizing conditions. However, it is preferred that the rubber be cross-linked by the process of dynamic vulcanization. As used in the specification and claims, the term "dynamic vulcanization" means a vulcanization or curing process for a rubber contained in a thermoplastic vulcanizate composition, wherein the rubber is vulcanized under conditions of shear at a temperature above the melting point of the polyester component. The rubber is thus simultaneously cross-linked and dispersed as fine particles within the polyester matrix, although as noted above, other morphologies may also exist. Dynamic vulcanization is effected by mixing the thermoplastic vulcanizate components at elevated temperature in conventional mixing equipment such as roll mills, Banbury mixers, Brabender mixers, continuous mixers, mixing extruders, and the like. The unique characteristic of dynamically cured compositions is that, notwithstanding the fact that the rubber component is partially or fully cured, the compositions can be processed and reprocessed by conventional plastic processing techniques such as extrusion, injection molding, blow molding and compression molding. Scrap or flashing can be salvaged and reprocessed.

The following general procedure was used in the preparation of thermoplastic vulcanizates of the present invention as set forth in the examples. Thermoplastic polyester, nitrile rubber, and the processing aids were mixed in a Brabender mixer at a temperature sufficient to melt the thermoplastic and form a blend. Curatives were then added to cross-link the rubber and mixing was continued until a maximum melt consistency was reached, usually between one and five minutes, then for an additional two to three minutes thereafter. The sequence of ingredient addition may vary, but generally all of the fillers should be added before substantial cross-linking, or vulcanization occurs. The stabilizers and plasticizers may be added either before or after vulcanization. The vulcanized composition was removed from the mixer, sheeted, and compression molded at 30° to 50° C. above the melting point of the thermo-plastic component, and cooled below 100° C. under pressure. Properties of the molded sheet were then measured.

The thermoplastic vulcanizate compositions of the present invention generally have good tensile strength, good elongation and good compression set properties. Most notably, they have very low oil swell, i.e., excellent oil resistance properties comparable to that of the thermoset nitrile rubber. Oil swell values as measured by the percent of weight gain at 150° C. for 72 hours is generally 25 percent or less, desirably 20 percent or less, and preferably 15 percent or less.

The thermoplastic vulcanizate compositions of the present invention can be used in applications wherever nitrile rubber is used. Thus they can be utilized as seals, as gaskets, hoses, boots, and the like, especially for automotive applications. The invention will be better understood by reference to the following examples which serve to illustrate, but not to limit, the present invention.

Thermoplastic vulcanizates (TPVs) were produced in a laboratory Brabender-Plasticorder, model EPL-V5502. The mixing bowl had a capacity of 60 ml with roller type rotors, which gave good mixing for samples with a batch weight of 40–45 grams. For higher batch weight TPVs, less bulky cam rotors were used, which gave a bowl capacity of 85 ml. TPVs were prepared at 240° C. and at 75-rpm rotor speed, unless indicated otherwise. The plastic materials were melted or partially melted in the mixer cavity prior to rubber addition. After a steady torque was obtained for 1 to 2 minutes in order to ensure as complete a homogenization as possible of the rubber and plastic melt blend, the curative was added and curing continued for about 8 minutes. The torque rise observed on curing leveled off after about 4 to 5 minutes into the cure. The TPV obtained was sheeted when hot in a cold press, and subsequently compression molded at 250° C. in order to produce plaques for physical testing. Plasticizers were added to the rubber and plastic melt blended prior to cure. When melt blending the plastic and rubber materials, it is important to at least partially melt the plastic prior to rubber addition. Masticating the rubber alone in the mixer will lead to thermooxidative crosslinking of the rubber which results in powdering of the rubber.

Utilizing the above general procedure, specific recipes as set forth in Tables 1–4 were formulated and prepared.

TABLE I

| Example | 1 | 2 | 3 | 4 | 5 | 6 | 7 | 8 | 9 | 10 |
|---|---|---|---|---|---|---|---|---|---|---|
| Composition | | | | | | | | | | |
| Nipol 1072 × 28 | 76 | 76 | 76 | 68 | 68 | 70 | 80 | 76.5 | 76.5 | 76 |
| Valox 315 | 24 | 24 | 24 | 32 | 32 | 30 | 20 | 23.50 | 23.50 | 24 |
| 1,3-PBO | — | — | — | 2.27 | 2.27 | 2.12 | 2.87 | — | — | — |
| Polybond 3009 | — | — | 2.38 | — | 4.53 | 2.12 | 2.49 | 2.35 | 2.35 | 2.38 |
| SP-1045 | — | 3.56 | 3.56 | — | — | — | — | — | — | — |
| Ultramox 626 | — | — | — | — | — | — | — | 1.56 | 1.56 | — |
| TPAP | — | — | — | — | — | — | — | — | — | 5.12 |
| Irganox B225 | — | — | — | — | — | — | — | — | — | 3.14 |
| HVA-2 | — | — | — | — | — | — | — | 2.51 | — | — |
| Matrimid 5292A | — | — | — | — | — | — | — | — | 2.51 | — |
| Properties | | | | | | | | | | |
| Hardness (Shore A) | 67 | 78 | 79 | 85 | 87 | 86 | 79 | 83 | 83 | 79 |
| UTS (psi) | 1208 | 1756 | 1891 | 2423 | 2855 | 3271 | 1803 | 2563 | 2515 | 1849 |
| UE (%) | 205 | 193 | 216 | 203 | 243 | 256 | 202 | 254 | 247 | 231 |
| M 100 (psi) | 700 | 946 | 966 | 1317 | 1393 | — | 883 | 1057 | 1063 | 874 |
| CS (%, 22 hr, 100° C.) | — | 9 | 10 | 17 | 18 | 19 | 11 | 13 | 15 | — |
| CS (%, 22 hr, 150° C.) | — | 29 | 29 | 40 | 35 | 35 | 23 | 29 | 29 | 52 |
| Wt. Gain (%, 72 hr, 150° C.) | — | 18 | 23 | 15 | 21 | 17 | 22 | 19 | 18 | 16 |

TABLE I-continued

| Example | 1 | 2 | 3 | 4 | 5 | 6 | 7 | 8 | 9 | 10 |
|---|---|---|---|---|---|---|---|---|---|---|
| Tension Set (%) | 13 | 9 | 11 | 16 | 18 | 13 | 7 | 11 | 11 | 9 |
| Consistency of Product | T | P | T | P | T | T | T | T | T | T |

T: Thermoplastic - P: Powder

TABLE II

| Example | 11 | 12 | 13 | 14 | 15 | 16 |
|---|---|---|---|---|---|---|
| Composition | | | | | | |
| Nipol 1072 × 28 | 75 | 76 | 76 | 76 | 76 | 76 |
| Valox 315 | 25 | 24 | 24 | 24 | 24 | 24 |
| 1,3-PBO | 2.34 | 2.38 | 2.38 | 2.38 | 2.38 | 2.41 |
| Polybond 3009 | — | 2.38 | — | — | — | — |
| Royaltuf 490 | — | — | — | — | — | 7.22 |
| Kraton FG-1901X | — | — | — | 2.38 | — | — |
| Irganox B225 | 3.10 | 3.14 | 3.14 | — | — | 2.24 |
| HD 6706.19 | — | — | 2.38 | — | 2.38 | — |
| Properties | | | | | | |
| Hardness (Shore A) | — | — | — | 79 | 81 | 73 |
| UTS (psi) | — | — | — | 2289 | 2048 | 1277 |
| UE (%) | — | — | — | 238 | 225 | 188 |
| M 100 (psi) | — | — | — | 915 | 923 | 669 |
| CS (%, 22 hr, 150° C.) | — | — | — | 30 | 32 | — |
| Wt. Gain (%; 72 hr, 150° C.) | — | — | — | 18 | 18 | — |
| Tension Set (%) | — | — | — | 7 | 8 | 6 |
| Consistency of Product | P | T | T | T | T | T |

P: Powder
T: Thermoplastic

TABLE III

| Example | 17 | 18 | 19 |
|---|---|---|---|
| Composition | | | |
| Nipol 1072 × 28 | 76 | 76 | 69.00 |
| Irganox B225 | 3.17 | — | — |
| 75PBT/25PBI | 24 | — | — |
| PET 13339 | — | 24 | — |
| Hytrel 8238 | — | — | 31.00 |
| Polybond 3009 | 2.38 | 2.38 | 2.37 |
| 1,3-PBO | 2.38 | 3.40 | 3.04 |
| Properties | | | |
| Hardness (Shore A) | 79 | 82 | 85 |
| UTS (psi) | 1911 | 1566 | 2630 |
| UE (%) | 253 | 161 | 242 |
| M100 (PSI) | 773 | 1052 | 1144 |
| CS (%, 22 hr, 100° C.) | 20 | 14 | 25 |
| CS (%, 22 hr, 150° C.) | 40 | 26 | 40 |
| Wt. Gain (%, 72 hr, 150° C.) | 19 | 20 | — |
| Tension Set (%) | 7 | 11 | 12 |
| Consistency of Product | T | T | T |

T: Thermoplastic

TABLE IV

| Example | 20 | 21 | 22 | 23 | 24 | 25 | 26 | 27 | 28 | 29 | 30 |
|---|---|---|---|---|---|---|---|---|---|---|---|
| Composition | | | | | | | | | | | |
| Nipol 1072 × 28 | 65 | 65 | 65 | 70 | 76 | 76 | 70 | 76 | 76 | 76 | 76 |
| Valox 315 | 35 | 35 | 35 | 30 | 24 | 24 | 30 | 24 | 24 | 24 | 24 |
| Polybond 3009 | 2.58 | 2.57 | 2.57 | 6.55 | 2.38 | 2.39 | 6.56 | 2.38 | 2.38 | 2.38 | 2.41 |
| 1,3-PBO | 2.03 | 2.04 | 2.04 | 2.18 | 2.40 | 2.41 | 2.19 | 2.38 | 2.38 | 2.38 | 2.41 |
| Irganox B225 | 3.14 | 3.14 | 3.14 | 2.18 | 2.29 | 2.29 | 2.45 | 2.29 | 2.29 | 2.29 | 2.29 |
| Reofos 50 | — | 16.32 | 25.35 | — | — | — | — | — | — | — | 11.39 |
| Uniplex 809 | — | — | — | — | 7.71 | — | — | — | — | — | — |
| Uniplex 413 | — | — | — | — | 7.67 | — | — | — | — | — | — |
| Plalsthall BSA | — | — | — | — | — | 18.75 | — | — | — | — | — |
| Paraplex G30 | — | — | — | — | — | — | — | 17.62 | — | — | — |
| Remarc P-40-60 | — | — | — | — | — | — | — | 11.50 | — | — | — |
| Calsol 8450 | — | — | — | — | — | — | — | — | 7.76 | — | — |
| Calsol 5120 | — | — | — | — | — | — | — | — | — | 7.71 | — |
| Flexxon 885 | — | — | — | — | — | — | — | — | — | — | 7.60 |
| Properties | | | | | | | | | | | |
| Hardness (Shore A) | 90 | 86 | 83 | 86 | 77 | 71 | 82 | 72 | 78 | 76 | 65 |
| UTS (psi) | 2709 | 1927 | 1698 | 2643 | 1672 | 1595 | 1771 | 1533 | 1891 | 1664 | 1103 |
| UE (%) | 249 | 231 | 235 | 262 | 250 | 254 | 248 | 251 | 239 | 230 | 204 |
| M 100 (PSI) | 1447 | 1034 | 902 | 1230 | 687 | 623 | 880 | 644 | 779 | 758 | 602 |
| CS (%, 22 hr, 100° C.) | 19 | 19 | 21 | 20 | — | 13 | 18 | — | — | — | 14 |
| CS (%, 22 hr, 150° C.) | 36 | 36 | 36 | 38 | 34 | 29 | 34 | — | — | — | 34 |
| Wt. Gain (%, 72 hr, 150° C.) | 14 | 1 | -4 | 18 | 4 | 8 | 9 | — | — | — | 5 |
| Tension Set (%) | 19 | 13 | 13 | 16 | 9 | 5 | 13 | 7 | 8 | 7 | 7 |
| Consistency of Product | T | T | T | T | T | T | T | T | T | T | T |

T: Thermoplastic

Elastomeric Materials

Nipol 1072×28: Carboxylic acid functional nitrile rubber. Bound acrylonitrile~27 weight percent. Carboxylic acid content: ~0.08 equivalents per hundred parts of rubber. Gel content: 50–60 weight percent in methyl ethyl ketone (Zeon Chemicals, Inc., Louisville, Ky.).

Nipol DN3635: Gel free nitrile rubber. Bound acrylonitrile: 36 weight percent (Zeon Chemicals, Inc., Louisville, Ky.).

Chemigum HR 665: Nitrile rubber with bound antioxidant and 34 weight percent bound acrylonitrile (Goodyear Tire and Rubber Company, Akron, Ohio).

Plastic Materials

Valox 315: Poly(tetramethylene terephthalate) with weight average molecular weight of about 105,000, and number average molecular weight of about 50,000 (GE Plastics, Pittsfield, Mass.).

75PBT/25PBI: 75:25 weight percent poly(butylene terephthalate/isophthalate) experimental polymer (AMOCO Chemicals, Naperville, Ill.).

PET 13339: Modified poly(ethylene terephthalate), m.p. 235° C. (Eastman Chemical Company, Kingsport, Tenn.).

Hytrel 8238: Polyester-ether segmented block copolymer thermoplastic elastomer with 82 Shore D hardness (DuPont Company, Wilmington, Del.).

Processing Aids

Royaltuf 490: Maleated EPDM rubber with 1 weight percent bound maleic anhydride (Uniroyal Chemical Company, Middlebury, Conn.).

Kraton FG-1901 X: Maleated styrene/ethylene-butene/styrene triblock copolymer with 2 weight percent bound maleic anhydride (Shell Chemical Company, Houston, Tex.).

Polybond 3009: Maleated high-density polyethylene with 1 weight percent bound maleic anhydride (Uniroyal Chemical Company, Middlebury, Conn.).

HD 6706.19: High-density polyethylene (Exxon Chemical Company, Houston, Tex.).

Crosslinking Compounds 1,3-PBO: 1,3-phenylenebis2,2'-(oxazoline-2) (Tramaco Japan Ltd., Tokyo, Japan).

SP-1045: Alkylated phenol/formaldehyde resin (Schenectady International, Inc., Schenectady, N.Y.).

HVA-2: 2,4-bismaleimidotoluene (DuPont Dow Elastomers, Stow, Ohio).

Matrimid 5292A: Bis (4-maleimidophenyl) methane (Ciba-Geigy Corporation, Brewster, New York).

TPAP: Trimethylolpropane tris(2-methyl-1-aziridenepropionate) (Aldrich Chemical Company, Milwaukee, Wis.).

Plasticizers

Reofos 50: Isopropylated triphenyl phosphate (C. P. Hall Company, Stow, Ohio).

Uniplex 809: Polyethylene glycol bis (2-ethylhexanoate) (Unitex Corporation, Greensboro, N.C.).

Uniplex 413: Substituted benzenesulfonamide (Unitex Corporation, Greensboro, N.C.).

Plasthall BSA: N-n-butylblenzenesulfonamide (C. P. Hall Company, Stow, Ohio).

Paraplex G-30: Mixed dibasic acid polyester (C. P. Hall Company, Stow, Ohio).

Remarc P-40-60: Chlorinated paraffinic oil with 39 weight percent chlorine (Harwick Chemical Corporation, Akron, Ohio).

Calsol 8450; 5120: Napthenic process oil (Sun Company, Canton, Ohio).

Flexon 885: Paraffinic process oil (Exxon Oil Company, Houston, Tex.).

Antioxidant

Irganox B225: Phenolic/Phosphite based antioxidant (Ciba Specialty Chemicals Corporation, Troy, Mich.).

Example 1 describes the preparation of a thermoplastic blend of carboxylated nitrile rubber and poly(butylene terephthalate).

EXAMPLES

Table I illustrates the effects of processing aids on cured compositions of carboxylated nitrile rubber and PBT.

On curing the blend of Example 1 with phenolic resin, a sticky and powdery product was isolated (Example 2) The compression molded plaque of this powdery product, however, exhibited good mechanical properties. In Example 3, the addition of maleated high-density polyethylene (Polybond 3009) to the recipe of Example 2 yielded a TPV that did not powder and could be easily removed from the mixer. It should be noted that the mechanical properties of the TPVs are considerably better than that of the uncured blend of Example 1.

Attempted TPV preparation from a blend of carboxylated nitrile rubber and poly(butylene terephthalate) with the use of 1,3-phenylenebis-2,2'-(oxazoline-2) as a curative also yielded a sticky and powdery product (Example 4) in the absence of a process aid. The use of a process aid along with the oxazoline curative allowed the production of a thermoplastic product that could be readily removed from the mixer cavity (Example 5). Example 6 illustrates the preparation of a TPV with a reduced amount of process aid when compared to the amount used in Example 5. In general, the lower the plastic content in a TPV recipe, the greater the chances of the production of an unprocessable product. The use of Polybond 3009 allows the preparation of a processable TPV unit with extremely low plastic to rubber ratio (20:80, Example 7).

Examples 8–10 demonstrate the production of processable TPVs based upon carboxylated nitrile rubber, poly (butylene terephthalate), and a maleated high-density polyethylene process aid, with maleimide and aziridine curatives.

Table II illustrates the use of different processing aids.

In Example 11, a melt blend of Nipol 1072×28 and Valox 315 (75:25 rubber to plastic weight ratio) was produced at 240° C. and 75 rpm cam rotor speed. After adding the 1,3-PBO curative, the rotor speed was increased to 200 rpm and curing was continued at this speed for 9 minutes. During the cure, shear heating caused the material temperature to rise to 296° C. A "crumbly" product that stuck to the mixer cavity was the result. The procedure of Example 11 was repeated where part of the plastic phase (Valox 315) was replaced either with high-density polyethylene or maleated high-density polyethylene (Examples 12 and 13). In both cases, the material obtained was cleanly removed from the mixer and only slightly more "crumbly" when compared with the corresponding experiments where the curing was conducted at 75 rpm. These examples illustrate further the importance of a process aid in the production of the thermoplastic TPVs of this invention.

Examples 14, 15, and 16 document the properties of processable TPVs obtained with the aid of a maleated styrene/ethylene butene/styrene triblock copolymer, a high-density polyethylene and a maleated EPDM rubber, respectively. When maleated EPDM is the process aid, soft compositions can be obtained.

Table III illustrates the use of different thermoplastic resins.

Various polyester based plastic materials such as poly (butylene terephthalate-co-isophthalate) (Example 17), a modified polyethylene terephthalate) (Example 18), and a poly(butylene terephthalate)/poly(tetramethylene glycol) segmented block copolymer (Example 19) can also be used in the practice of this invention.

Table IV illustrates the applicability of plasticizers.

The hard TPV composition of Example 20 was plasticized to softer compositions in Examples 21 and 22 with the aid of an isopropylated triphenyl phosphate as plasticizer. About 63 grams of the TPVs of Examples 20–22 were passed through a small single screw extruder at 500° F. Good melt strength was observed for these TPVs, with the plasticized TPVs exhibiting good surface smoothness. The fair surface smoothness of the TPVs of Example 20 was improved in a formulation containing additional Polybond 3009 (Example 23). Examples 24–30 illustrate the suitability of various polar and nonpolar plasticizers. In the practice of this invention.

TPVs OF NITRILE RUBBER AND THERMOPLASTIC POLYURETHANE

The invention also relates to thermoplastic vulcanizates (TPVs) produced from thermoplastic polyurethane (TPUs) and carboxylated nitrile rubber (CNBR) utilizing addition type curatives and processing aids.

The curatives of this invention have no direct or indirect adverse effect on the polyurethane plastic phase as do some conventional rubber curatives such as phenolic resin and peroxide. For example, phenolic resins produce water by the thermal decomposition which can subsequently breakdown the TPU causing carbon dioxide evolution. The curatives also react with the acid groups of CNBR by an addition reaction which results in the crosslinking of the rubber without the evolution of volatiles (such as water) which can break down the TPU phase and compromise TPV physical properties. Trace amounts of water in a TPV composition can cause the thermoplastic phase to breakdown when processed. Residual steam or carbon dioxide liberated by the action of steam on the TPU can be contained in the melt, for example, in an extruder. As the extrudate exits the die, the release of pressure on the extrudate strand causes formation of gas bubbles and excessive extrudate swell. This phenomenon was observed for the neat TPUs as well as TPU/CNBR TPVs produced with phenolic resin or peroxide as rubber curatives.

The use of the curatives of the present invention considerably reduced or eliminated the above noted problems, presumably due to a suitably formed TPV morphology. That is, the large plastic surface area generated due to the presence of small rubber particles helped degas the TPV melt within the extruder, thus allowing the preparation of a void free extrudate.

Another adverse problem is that typically, molten TPUs stick to metal and cause difficulty in processing and equipment clean up. The TPVs of the present invention have a considerable reduced tendency to stick to metal when compared with TPUs. The present invention also discloses the use of additives that further reduce molten TPV stickiness to metal, without compromising TPV physical properties.

Considering the nitrile rubbers of the present invention, they are carboxylated and are blended with the polyurethane. The carboxylated nitrile rubbers are described herein above and the description thereof is hereby fully incorporated by reference.

The amount of the conjugated diene content within the copolymer is thus generally a majority that is from about 50 percent to about 80 percent by weight and desirably from about 55 percent to about 75 percent by weight.

The nitrile rubber utilized in this invention may also be partially precrosslinked with a gel content of up to 80%. That is, up to 80% by weight of the rubber is not dissolved by boiling methyl ethyl ketone.

The amounts of the one or more carboxylated nitrile rubbers is generally from about 50 to about 500 parts by weight, desirably from about 100 to about 300 parts by weight, and preferably about 200 to about 250 parts by weight for every 100 parts by weight of the one or more thermoplastic polyurethane polymers.

The thermoplastic polyurethane is made in a conventional manner, as known in the art, as well as in literature. Typical polyurethanes are made from a polyol intermediate and generally an equivalent amount of a polyisocyanate. The polyol intermediate is generally a liquid polyether polyol or a polyester polyol or combinations thereof having a number average of molecular weight of from about 450 to about 6,000 with from about 600 to about 4,500 being preferred. In order to avoid crosslinking, generally only polyether or polyester diols are utilized.

Polyether polyols are generally made by reacting an alkylene oxide having from 2 to about 10 carbon atoms such as propylene oxide with a strong base such as potassium hydroxide, preferably in the presence of water, glycols and so forth. Polyether polyols made from ethylene oxide, propylene oxide, or epoxides, or copolymers thereof, are preferred. Other polyethers which can be utilized are those which are produced as by polymerization of tetrahydrofuran or epoxides such as epichlorohydrin, ethylene oxide, propylene oxide, butylene oxide, styrene oxide, for example in the presence of Lewis catalysts such as boron trifluoride, or by the addition of epoxides, preferably of ethylene oxide and propylene oxide, optionally mixed or in succession, onto starter components with reactive hydrogen atoms such as water, alcohols, ammonia, or amines, for example ethylene glycol, 1,3- or 1,2-propylene glycol, water, 4,4'-dihydroxydiphenyl-propane, aniline, ethanolamine or ethylenediamine.

Polyester polyols are formed from the condensation of one or more polyhydric alcohols having from 2 to 15 carbon atoms with one or more polycarboxylic acids having from 2 to 14 carbon atoms. Examples of suitable polyhydric alcohols include the following: ethylene glycol, propylene glycol such as 1,2-propylene glycol and 1,3-propylene glycol, glycerol; pentaerythritol; trimethylolpropane; 1,4,6-octanetriol; butanediol; pentanediol; hexanediol; dodecanediol; octanediol; chloropentanediol, glycerol monallyl ether; glycerol monoethyl ether, diethylene glcol; 2-ethylhexanediol-1,4; cyclohexanediol-1,4; 1,2,6-hexanetriol; 1,3,5-hexanetriol; 1,3-bis-(2-hydroxyethoxy) propane, 1,4- and 2,3-butylene glycol, neopentyl glycol, 1,4-bis(hydroxymethyl)cyclohexane, trimethy-lolethane, together with di-, tri-, tetra-, and higher polyethylene glycols, di- and higher polypropylene glycols, together with di- and higher polybutylene glycols, and the like. Examples of polycarboxylic acids include the following: phthalic acid; isophthalic acid; terephthalic acid; tetrachlorophthalic acid; maleic acid; dodecylmaleic acid; octadecenylmaleic acid; fumaric acid; aconitic acid; trimellitic acid; tricarballylic acid; 3,3'-thiodipropionic acid; succinic acid; adipic acid; malonic acid, glutaric acid, pimelic acid, sebacic acid, cyclohexane-1,2-dicarboxylic acid; 1,4-chclohexadiene-1,2-dicarboxylic acid; 3-methyl-3,5-cyclohexadiene-1,2-dicarboxylic acid and the corresponding acid anhydrides such as tetrahydrophthalic anhydride, hexahydrophthalic anhydride, tetrachlorophthalic anhydride, endomethylene-tetrahydrophthalic anhydride, acid chlorides and acid esters such as phthalic anhydride, phthaloyl chloride and the dimethyl ester of phthalic acid, dimerized and trimerized unsaturated fatty acids, optionally mixed with monomeric unsaturated fatty acids, terephthalic acid monomethyl ester and terephthalic acid monoglycol ester. Preferred polycarboxylic acids are the aliphatic and cycloaliphatic dicarboxylic acids containing no more than 14 carbon atoms and the aromatic dicarboxylic acids containing no more than 14 atoms. Any polyhydric alcohol having more than 2 hydroxyl groups or any polycarboxylic acid having more than 2 carboxylic groups used to make the polyesters should be used in only very minor amounts to prevent crosslinking and gelling.

Polyesters from lactones (for example e-caprolactone) and polyacetals, polycarbonates or polybutadienes containing terminal hydroxyl groups are also suitable.

Highly preferred polyol intermediates include polypropylene ether diol, poly-1,2-butylene ether diol, and most preferably poly-1,4-tetramethylene ether, and epsilon-polycaprolactone diols.

Isocyanates which may be used are aliphatic, cycloaliphatic, araliphatic, aromatic and hetrocyclic polyisocyanates or any desired mixtures of these polyisocyanates (c.f. Houben-Weyl, Methoden der Organischen Chemie, volume E 20, Makromolekulare Stoffe, Georg Thieme Verlag, Stuttgart, N.Y.1978, pages 1587–1593). Examples are ethylene diisocyanate, 1,4-tetramethylene diisocyanate, 1,6-hexamethylene diisocyanate, 1,12-dodecane diisocyanate, 1,3-cyclobutane diisocyanate, 1,3- and 1,4-cyclohexane diisocyanate together with any desired mixtures of these isomers, 1-isocyanato-3,3,5-trimethyl 5-isocyanatomethyl-cyclohexane, 2,4- and 2,6-hexahydrotolylene diisocyanate together with any desired mixtures of these isomers.

Aromatic polyisocyanate is preferred and generally has a formula $R(NCO)_2$. Inasmuch as combinations of various polyisocyanates can be utilized, it is to be understood that the amount is not necessarily an integer such as two. R is an aliphatic having from about 2 to about 20 carbon atoms with from about 6 to about 15 carbon atoms being preferred, or an aromatic including an alkyl substituted aromatic having from about 6 to about 20 carbon atoms with from about 6 to about 15 carbon atoms being preferred, or combinations thereof. Examples of suitable polyisocyanates include 1,6-diisocyanato hexane, 2,2,4- and/or 2,4,4-trimethyl hexamethylene diisocyanate, p- and m-tetramethyl xylene diisocyanate, dicyclohexylmethane-4,4'-diisocyanate (hydrogenated MDI), 4,4-methylene diphenyl isocyanate (MDI), p- and m-phenylene diisocyanate, 2,4- and/or 2,6-toluene diisocyanate (TDI), durene-1,4-diisocyanate, isophorone diisocyanate, isopropylene-bis-(p-phenylene) diisocyanate) and sulfone-bis-(p-phenylene) Diisocyanate. The various diphenyl methane diisocyanates (MDI) and mixtures of MDI with polymeric MDI having an average isocyanate functionality of approximately 2 is preferred.

Isocyanates having a higher functionality can also be used, such as 4,4',4"-triphenylmethane triisocyanate, polyphenyl/polymethylene polyisocyanates (for example obtained by aniline/formaldehyde condensation and subsequent phosgenation), together with the distillation residues containing isocyanate groups which arise during industrial isocyanate production, optionally dissolved in one or more of the above-stated polisocyanates. However, care must be taken in this case to ensure that an average functionality of two is not substantially exceeded if the polyurethanes are to be melt processed. It may optionally be necessary to compensate for reactants with an elevated functionality by also using other reactants with a functionality of lower than two. Monofunctional isocyanates suitable for this purpose are, for example, stearyl isocyanate, cyclohexyl isocyanate and phenyl isocyanate.

Other descriptions of TPUs and TPU forming components including disocyanates, hydroxy terminated polyethers and polyesters, and diamines, which can be utilized in the present invention, can be found in U.S. Pat. Nos. 5,142,001, 5,739,252; and 5,905,133 which are incorporated fully herein by reference. TPUs containing crosslinked polyurethanes as set forth in U.S. Pat. No. 5,908,894 are also suitable for the practice of this invention and is also hereby fully incorporated by reference.

TPUs suitable for practice of this invention may be partially crystalline due to the hard segment content where the crystalline domains act as virtual crosslinks to render the TPU elastic and also allow thermo-plastic processability at elevated temperatures by crystallite melting. Completely amorphous TPUs are also suitable for the practice of this invention.

The equivalent ratio of the polyisocyanate to the polyether or polyester polyol, i.e. NCO/OH is generally from about 0.90 to about 1.10, desirably from about 0.95 to about 1.05, and preferably from about 0.97 to about 1.03.

The urethane prepolymers of the present invention are generally extended by a polyol having generally two active hydroxyl groups. Such extending polyols are generally discussed herein above with regard to the intermediate polyol and thus are fully incorporated by reference. Chain extenders generally have an average of 1.8 to 3.0 Zerewitinoff active hydrogen atoms and a molecular weight of about 62 to about 400. These compounds include compounds containing amino groups, thiol groups or carboxyl groups and those with two to eight, preferably two hydroxyl groups.

Examples of chain extending compounds are di- and polyols such as ethylene glycol, 1,2- and 1,3-propylene glycol, 1,4- and 2,3-butylene glycol, 1,5-pentanediol, 1,6 hexanediol, 1,8-octanediol, neopentyl glycol, 1,4-bis (hydroxymethyl)cyclohexane, 2-methyl-1,3-propanediol, glycerol, trimethylolpropane, 1,2,6-hexanetriol, trimethylolethane and pentaerythritol, di, tri-, tetra- and higher polyethylene glycols with a molecular weight of up to 400, together with di- and higher polypropylene glycols with a molecular weight of up to 400, 4,4'-dihydroxydiphenylpropane, di(hydroxymethyl) hydroquinone, ethanolamine, diethanolamine, N-methyidiethanolamine, triethanolamine and 3-aminopropanol; aliphatic diamines such as, for example, ethylenediamine, 1,4-tetramethylenediamine, hexamethylenediamine, together with the mixtures thereof, 1-amino-3,3,5-trimethyl-5-aminomethylcyclohexane ("isophoronediamine"), 2,4- and 2,6-hexahydrotoluylenediamine together with the mixtures thereof, perhydro-2,4'and -4,4'-diaminodiphenylmethane, p-xylylenediamine and bis-(3-aminopropyl)methylamine; aromatic diamines which may be utilized are bisanthranilic acid esters, 3,5- and 2,4-diaminobenzoic acid esters, 3,3'-dichloro-4,4'-diaminodiphenylmethane, tolylenediamine and 4,4'-diaminodiphenylmethane. Chain extenders are utilized in an effective amount to achieve desired end results.

Compounds which are monofunctional towards isocyanates may also be used in proportions of up to 2 wt. %, relative to the thermo-plastic polyurethan elastomer, as chain terminators. Suitable compounds are, for example, monoamines such as butyl- and dibutylamine, octylamine, stearylamine, N-methylstearylamine, pyrrolidine, piperidine and cyclohexylamine, monoalcohols such as butanol, 2-ethylhexanol, octanol, dodecanol, the various amyl alcohols, cyclohexanol and ethylene glcol monomethyl ether, with 2-ethylhexanol and ethylene glycol monomethyl ether being preferred.

Catalysts are often utilized to promote the urethane chain extension and preferably include tin compounds such as, for example, various stannous carboxylates such as stannous acetate, stannous octoate, stannous laurate, stannous oleate and the like; or dialkyl tin salts of carboxylic acids such as dibutyltin diacetate, dibutyltin dilaurate, dibutyltin maleate, dibutyltin di-2-ethylhexoate, dilauryltin diacetate, dioctyltin diacetate and the like. As an alternative or in addition to the above tin compounds, various tertiary amines can be used such as triethylamine, benzyldimethylamine, triethylenediamine, and tetramethylbutanediamine. The tin catalysts, when utilized, are generally used in amount of 0.5 parts or less, i.e., in the range of about 0.01 to 0.5 parts, by weight per 100 parts of prepolymer. The tertiary amine catalysts, when utilized, can be used in amounts of 0.01 to about 5 parts by weight per 100 parts of prepolymer. In addition to the above catalysts, further compounds which may be considered are: titanium, bismuth and antimony compounds, such as for example antimony triisopropoxide, antimony octcate, antimony tallate, bismuth salts of carboxylic acids with 2 to 20 carbon atoms, such as for example bismuth trioctanoate, dibutylbismuth octanoate, triphenylbismuth didecanoate and dibutyltitanium bis (acetylacetonate).

Further usable catalysts together with details of the mode of action of the catalysts are described in Kunststoff Handbuch volume VII, *Polyurethane*, edited by Vieweg Hochtlen, Carl Hanser Verlag, Munich 1966, for example on pages 96 to 102.

The amount of catalysts, when utilized, is generally from about 0.01 to about 1.0 parts by weight per 100 parts by weight of the prepolymer.

Stickiness to metal of the molten products of this invention can be reduced by the addition of maleated hydrocarbon polymers to the desired TPV composition (TPU/carboxylated NBR) either prior or subsequent to dynamic vulcanization. The various processing aids enhance processing properties. Such processing aids or agents are described herein above and accordingly fully incorporated by reference. Desirable processing agents are maleated polyethylene or maleated polypropylene, that is, a graft of maleic anhydride and polyethylene or polypropylene, maleated ethylene/α-olefin copolymers having an α-olefin content of from about 0 or 1 to about 55 wt %, said (α-olefins including propylene, 1-butene, 1 hexane, 1 octane, styrene and alkylated styrenes (methylstyrene, ethylstyrene). Further desired processing aids are maleated styrene-ethylene/butene-styrene triblock copolymer, maleated EP rubber, ethylene-acrylate-glycidylmethacrylate copolymers, ethylene-acrylate-acid functional rubber, ethylene/methyl acrylate/acid functional rubber (such as "Vamac" from Dupont), poly(ethylene/vinyl acetate/methacrylic acid), poly(ethylene/vinyl acetate)-graft maleic anhydride, poly(ethylene/glycidyl methacrylate) GMA), poly(ethylene/acrylic or methacrylic acid), poly(propylene/acrylic or methacrylic acid), maleic anhydride/α-olefin copolymers (such as maleic anhydride/1-octene copolymer), or maleic anhydride/styrene copolymers or combinations of the above mentioned processing agents can be used. Other desirable processing aids include polyethylene, polypropylene, ethylene-propylene rubber, EPDM rubber, or ethylene/1-olefin copolymers (such as ethylene /1-butene, ethylene/1-hexene, ethylene/1-octene) grafted with 1 to 6 weight percent of acrylic or methacrylic acid or 1 to 60 weight percent of styrene/acrylonitrile copolymer where acrylonitrile content can range from 5% to 95%. Preferred processing aids include maleated polypropylene, maleated polyethylene, maleated EP Rubber, and maleated ethylene/α-olefin rubber such as ethylene/butene copolymer.

The amount of a processing or compatabilizing agent generally ranges from about 2 to about 20 parts by weight and preferably from about 5 to about 15 parts by weight based upon 100 parts per weight of the thermoplastic polyurethane resin.

As with thermoplastic vulcanizates of carboxylated nitrile rubber and polyester thermoplastics discussed herein above, the thermo-plastic vulcanizates of carboxylated nitrile rubber and thermoplastic polyurethanes are prepared by dynamic vulcanization which generally results in the formation of a compatible blend of the polyurethane as a continuous phase and the nitrile rubber as a discontinuous phase. However, other possible morphologies can also exist.

The nitrile rubber is cured utilizing various curative compounds including oxazoline, oxazine, and imidazolines such as bisimidazoline. More specifically, the nitrile rubber phase is cured via the bound acid functionality present, using addition type curing agents such as preferably 1,3-phenylene-bis 2,2'-(oxazoline-2), which avoids the generation of undesirable volatiles.

An important aspect of the present invention is the utilization of addition type curatives which, do not break down the plastic phase and do not form volatile compounds such as water. While other curing agents can be utilized such as free radical generating compounds, the same are not desired and thus used in small amounts such as generally less than 1.0 parts by weight and desirably less than 0.5 parts by weight based upon 100 parts by weight of the carboxylated nitrile rubber. A highly preferred addition curative or cross-linking agent is the various oxazolines or oxazines such as those having the formula

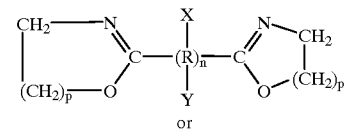

or

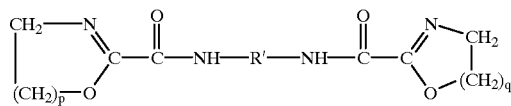

wherein R or R' is an aliphatic or aromatic hydrocarbon group such as alkylene or arylene having 1 to 24 carbon atoms optionally substituted with one or more alkyl groups having 1 to 6 carbon atoms or substituted with an aryl group having 6 to 9 carbon atoms; n is 0 or 1, when n equals 1 then X and Y are hydrogen atoms or independently an 2-oxazoline group or a 1,3-oxazine group, or a 2-oxazoline group or a 1,3-oxazine group and a hydrogen atom, with the remaining carbon atoms having hydrogen atoms thereon, p and q, independently, is 1 or 2, and when n equals 0 then R, X, and Y are nonexistent. Further, each oxazoline group of the above formula may optionally be substituted with an alkyl of 1 to 6 carbon atoms. Further descriptions of said polyvalent oxazolines are set forth in U.S. Pat. No. 4,806, 588, herein incorporated by reference. Preferred oxazolines include 2,2'-bis(oxazoline-2), 2,2'hexamethylenedicarbamoylbis (oxazoline-2), and 1,3-phenylene-2,2'bis(oxazoline-2).

As a result of inertness towards the molten TPU, the curatives of the present invention allow the preparation of TPVs with enhanced properties over the corresponding simple rubber and plastic blends, which is not attainable by the use of conventional nitrile rubber cure systems, such as peroxides. Practice of the present invention also allows the preparation of TPU containing products with improved processability over conventional TPUs due to the ready degassability of the molten material of this invention, and also due to the greatly reduced stickiness of the molten TPV to metal.

The amount of the curative utilized is generally from about 0.05 to about 12, desirably from about 0.75 to about 8, and preferably from about 1 to about 5 parts by weight for every 100 parts by weight of a carboxylated nitrile rubber.

As noted above, the present invention is desirably substantially free of and preferably is completely free of curatives such as sulfur, peroxide, and phenolic resins. Curing with sulfur leads to unstable phase morphology. Peroxides are not used because they are known to affect the plastic phase (see U.S. Pat. No. 5,760,158), which would adversely affect processability as noted above. By the term "substantially free" is meant that the total amount of sulfur, peroxide, or phenolic resin or combinations thereof, is generally less than 2, desirably less than 1.0, preferably less than 0.5 parts by weight per 100 parts by weight of said rubber.

The carboxylated nitrile rubber—polyurethane blends of the current invention can contain various conventional additives, such as reinforcing and non-reinforcing fillers extenders, etc., as set forth herein above and also fully incorporated by reference.

Dynamic vulcanization is utilized to blend and cure the nitrile rubber-polyurethane blend. Generally, the degree of cured of carboxylated nitrile rubber is at least about 70 or 80, desirably at least 85, and preferably 90 or 95 percent. The manner in which such a blend is mixed and cured is set forth herein above.

The present invention will be better understood by reference of the following examples, which serve to illustrate but not limit the present invention.

EXAMPLES

Thermoplastic vulcanizates (TPVs) of the present invention were produced in a Brabender-Plasticorder model EPL-VS502. The mixing bowl had a capacity of 85 ml with cam rotors, which gave good mixing. TPVs were prepared at 200° C. and 75 rpm rotor speed unless specified otherwise. The TPUs were heated to temperature in the mixer about 2-½ min. before rubber addition. About 4-½ min. after rubber addition the machine torque leveled off, indicating the formation of a uniform rubber and plastic molten blend. At this time, the curative 1,3-phenylene bis 2,2'(oxazoline-2) (1,3 PBO) was added which caused a torque rise for about 2 min after which the machine torque leveled off. The molten TPV was further mixed for five more minutes, after which it was removed from the Brabender, sheeted in a cold press, and subsequently compression molded at 410° F. to obtain plaques for physical testing. Compression set was measured on plied discs as per ASTM method B.

When neat TPV or TPU/rubber blend properties were measured, the desired samples were obtained by heating the plastic pellets or pellet/rubber blend for about 10–11 minutes in the Brabender at 200° C. and 75 rpm. Plaques for testing were obtained from the molten product as described earlier.

Example 1 sets forth the physical properties of a hard polyether based amorphous TPU obtained from pellets provided by BASF. The TPU pellets were not dried before use. The tensile strength, ultimate elongation, and compression set data were a close match to that of the material specifications. The sample of Example 2 was produced by adding phenolic resin (resole type) to the molten TPU of Example 1. TPU pellets were masticated in the Brabender at 75 rpm and 200° C. for about seven minutes before phenolic resin addition. On phenolic resin addition, the machine torque increased gradually and leveled off only at about 16 minutes after curative addition. Undoubtedly a reaction was occurring between the phenolic resin and the TPU. It is also known that water, a by-product of phenol resin heating, causes TPU chemical degradation and subsequent carbon dioxide evolution from the molten plastic. As the data of Example 2 indicates, the action of phenolic resin on the TPU has caused a deterioration of TPU compression set properties. Hence, phenolic resin is not a suitable curative for the olefinic unsaturation in the rubber during TPU/carboxylated NBR TPV formation. This is further illustrated by the comparison of the physical properties of the product of Example 3 (TPU/CNBR blend) with those of Example 4 (TPU/CNBR TPV produced with phenolic resin cure for the rubber phase). Elastic recovery as measured by compression set is actually worse for the TPV (Example 4) when compared with that of the blend (Example 3). This data illustrates the fact that the rubber curative should not affect the TPV plastic phase so that products with suitable physical properties and processability may be obtained (see also later discussion).

Peroxide is also an unsuitable rubber curative when TPU forms the TPV plastic phase. In Examples 5–7, a peroxide and a coagent that assists peroxide cure of the rubber were separately (Examples 5,6) or together (Example 7) dispersed into the rubber at room temperature before rubber addition to the molten TPU, in order to ensure as low of an exposure of the peroxide to the TPU during dynamic vulcanization. It is clear that suitable vulcanization did not take place in Examples 5–7 when comparing the physical properties of these products (especially compression set) to the unvulcanized rubber and plastic blend of Example 8.

The products of Examples 1–8 were fed through a small laboratory single screw extrude (about 60 g was the minimum amount of material required) at 400° F. in order to extrude a solid tube of material. In all cases, extrudate swell to 2–3 times the die diameter and the presence of a considerable number of expanding gas bubbles in the melt was observed. In Examples 1 and 8, residual moisture in the TPU undoubtedly cause some TPU chemical degradation. The residual moisture and/or carbon dioxide generated from the TPU degradation was not completely devolitalized in the extruder, but continued to be held in the melt under pressure.

In contrast to the phenolic resin and peroxide rubber curatives, 1,3-PBO does not breakdown the TPU plastic phase, and the curing reactive of 1,3-PBO with the rubber is an addition reaction of the oxazoline functionality with the acid groups in the rubber, thereby avoiding the evolution of volatiles that can cause polymeric material breakdown and/or material processing problems. There is a considerable enhancement in physical properties (tensile strength, compression set) when the properties of a TPU/carboxylated NBR blend (Examples 8, 9) are compared to the corresponding dynamic vulcanizates (Examples 10, 11) where 1,3-PBO was used as the rubber curative. Solid tube extrudates of the TPV samples of Examples 10 and 11 exhibited minimum die swell and gas bubble entrapment when compared with the corresponding blends of Examples 8 and 9 or the products of Examples 1–7. In fact, no gas bubbles were visible in the extrudate of the sample of Example 10.

TPV morphology consists of micron sized crosslinked rubber particles in a continuous plastic matrix. Hence, on dynamic vulcanization, the relatively low area of contact between the rubber and plastic phase in the blend is increased tremendously in the vulcanizate due to the increased surface area provided by the particulate rubber. Presumably, this increased surface area established for the plastic phase allows efficient degassing of the product while in the extruder, thereby improving extrudate quality over that of the neat TPU, rubber/plastic blends, and resin or peroxide cured dynamic vulcanizates where the appropriate TPV morphology may not be formed. Hence the TPUs of this invention have a processing advantage over TPUs and other TPVs where phenolic resin or peroxide is used as the rubber phase curative.

As previously observed, physical properties are improved on curing the TPU/CNBR/maleated polyolefin blends with 1,3-PBO by dynamic vulcanization (compare Examples 13 and 14).

The neat TPUs used in Examples 1 and 12 were very sticky and difficult to remove from the mixer in the molten state. The TPU/carboxylated NBR blends were also sticky, though less so than the neat TPUs. The products of Examples 2–7 were also very sticky. The TPVs of this invention, where 1,3-PBO was the curative, were much less sticky and could easily be removed from the mixer without any residual material being stuck to the mixing chamber or rotors. Product stickiness could further be reduced and product removal from the mixer could further be enhanced by the addition of maleated polyolefins to the mix before or after dynamic vulcanization (Examples 14–16). This is particularly important for products obtained using the soft TPU (85 Shore A) as the plastic phase, which gave very sticky products without the benefit of the additives of this invention. The addition of a limited amount of the desired additives does not affect TPV properties as per the data provided (compare Examples 10 and 16; 11 and 18).

Example 19 illustrates the preparation of a non-sticky, very soft TPU based TPV.

Examples 21 and 22 illustrate the applicability of this invention in the case where the TPU plastic phase is partially crystalline. In Example 20, the physical properties of the neat crystalline TPU are listed.

Practice of this invention also allows the preparation of TPVs with increased upper service temperature over comparable TPUs. The drop in modulus with temperature for a TPV of this invention is lower than that observed for a comparable hardness TPU, indicating an increased upper service temperature for the products of this invention. A drop in modulus of 17.9% is observed when the temperature is increased from 50° C. to 80° C. for the TPV of Example 16 (87 Shore A hardness). In comparison, the observed drop in modulus for an 83 Shore A TPU is 33.5% (Example 12), and 41.6% for a 92 Shore A TPU (Example 1). At 100° C. the TPV of Example 16 has lost 31.3% of its elastic modulus at 50° C., whereas the loss for the TPUs of Examples 12 and 1 is 47% and 52.8%, respectively. It is reasonable to conclude that the service temperature of the TPV of Example 16 has been raised at least 20° C. over that of the TPUs of Examples 12 and 1. A similar conclusion can be drawn in the case of the TPV of Example 22 in comparison to the TPU of Example 20. In fact, the TPU test bar of Example 20 lost its physical integrity at 160° C., whereas the TPV of Example 22 maintained its physical integrity to 200° C.

In summary, the TPVs of this invention provide over the currently available TPVs:

1. Improved melt processability by providing a mechanism for efficient product melt phase degassing.

2. Improved processability due to the decreased tendency of the product melt to adhere to metal.

3. Improved TPV physical properties using the curatives of this invention.

4. Increased upper service temperature for the TPV.

TABLE 1

| EXAMPLE | 1 | 2 | 3 | 4 | 5 | 6 | 7 | 8 | 9 | 10 | 11 | 12 |
|---|---|---|---|---|---|---|---|---|---|---|---|---|
| BASF Elastollan 1195A | 100 | 100 | | | 233 | 233 | 233 | 233 | | 233 | | |
| SP-1045 Phenolic Resin | | 3 | | 3.36 | | | | | | | | |
| Nipol 1072 × 28 | | | 100 | 100 | 100 | 100 | 100 | 100 | 100 | 100 | 100 | |
| Vulcup 40 KE | | | | | 2.00 | | 2.00 | | | | | |
| HVA-2 | | | | | | 2.00 | 2.00 | | | | | |
| Irganox B225 | | | 5.46 | 5.46 | | | | 7.30 | 5.46 | 7.30 | 5.46 | |
| Polybond 3009 | | | 9.37 | 9.37 | | | | | | | | |
| BASF Elastollan 1185A | | | 150 | 150 | | | | | 150 | | 150 | 100 |
| 1,3-PBO | | | | | | | | | | 3.14 | 3.15 | |
| Hardness (Shore A) | 92 | 87 | 67 | 66 | 81 | 77 | 78 | 82 | 67 | 84 | 68 | 83 |
| UTS (MPa) | 38.6 | 36.3 | 13.6 | 17.1 | 13.3 | 10.4 | 17.7 | 9.8 | 5.43 | 19.0 | 12.8 | 41.3 |
| UE (%) | 595 | 479 | 773 | 712 | 517 | 526 | 416 | 487 | 663 | 405 | 438 | 541 |
| M100 (MPa) | 11.1 | 10.3 | 3.34 | 3.19 | 5.84 | 5.52 | 5.52 | 6.57 | 2.66 | 7.32 | 3.30 | 6.54 |
| CS (%, 22 hr, 70° C.) | 62 | 79 | 69 | 74 | 67 | 74 | 71 | 62 | 70 | 42 | 49 | 70 |
| Wt. Gain (%, 22 hr, 100° C.) | 9 | 10 | 25 | 28 | 14 | 13 | 12 | 11 | 14 | 10 | 15 | 14 |
| TS (%) | 17 | 11 | 10 | 7 | 8 | 9 | 8 | 18 | 9 | 10 | 6 | 11 |

TABLE 2

| Example | 13 | 14 | 15 | 16 | 17 | 18 | 19 |
|---|---|---|---|---|---|---|---|
| BASF Elastollan 1195A | 233 | 233 | 233 | 233 | | | |
| Nipol 1072 × 28 | 100 | 100 | 100 | 100 | 100 | 100 | 100 |
| Irganox B225 | 7.30 | 7.30 | 7.30 | 7.30 | 5.46 | 5.46 | 5.46 |
| 1,3-PBO | | 3.14 | 4.71 | 4.71 | | 3.15 | 3.15 |
| MEB Copolymer | 9.36 | 9.36 | 9.36 | | | | 31.9 |
| Polybond 3009 | | | | 9.36 | 9.37 | 9.37 | |

TABLE 2-continued

| Example | 13 | 14 | 15 | 16 | 17 | 18 | 19 |
|---|---|---|---|---|---|---|---|
| BASF Elastollan 1185A | | | | | 150 | 150 | 127 |
| Hardness (Shore A) | 83 | 83 | 83 | 87 | 66 | 73 | 65 |
| UTS (MPa) | 10.0 | 17.5 | 25.4 | 18.3 | 5.21 | 12.9 | 11.1 |
| UE (%) | 514 | 411 | 436 | 363 | 613 | 420 | 346 |
| M100 (MPa) | 6.23 | 7.08 | 7.63 | 8.59 | 2.74 | 4.02 | 3.34 |
| CS (%, 22 hr, 70° C.) | 64 | 42 | 43 | 43 | 68 | 43 | 44 |
| Wt. Gain (%, 22 hr, 100° C.) | 15 | 13 | 13 | 11 | 16 | 13 | 37 |
| TS (%) | 18 | 12 | 9 | 11 | 9 | 6 | 5 |

TABLE 3

| Example | 20 | 21 | 22 |
|---|---|---|---|
| Estane 58144 | 100 | 150 | 150 |
| Nipol 1072 × 28 | | 100 | 100 |
| Irganox B225 | | 5.46 | 5.46 |
| 1,3-PBO | | | 3.15 |
| Hardness (Shore A) | 92 | 88 | 90 |
| UTS (MPa) | 23.5 | 10.0 | 15.7 |
| UE (%) | 213 | 310 | 262 |
| M100 (MPa) | 22.2 | 8.55 | 10.2 |
| CS (%, 22 hr, 70° C.) | 65 | 69 | 38 |
| Wt. Gain (%, 22 hr, 100° C.) | 5 | 9 | 9 |
| TS (%) | 47 | 31 | 18 |

TPVs were prepared at 220° C. for this set of experiments.

Elastomeric Materials

Nipol 1072×28: Carboxylic acid functional nitrile rubber. Bound acrylonitrile~27 weight percent. Carboxylic acid content: ~0.08 equivalents per hundred parts of rubber. Gel content: 50–60 weight percent in methyl ethyl ketone (Zeon Chemicals, Inc., Louisville, Ky.).

Thermoplastic Polyurethanes

Elastollan 1195A: 95 Shore A hardness amorphous polyether based polyurethane (BASF Corporation, Wyandotte, Mich.).

Elastollan 1185A: 85 Shore A hardness amorphous polyether based polyurethane (BASF Corporation, Wyandotte, Mich.).

Estane 58155: 65 Shore D hardness partially crystalline (MP 182° C., 192° C., 205° C.—DDS peaks) polyether based polyurethane (B. F. Goodrich Company, Brecksville, Ohio).

Process Aids

Polybond 3009: Malected high density polyethylene with 1 weight percent bound maleic anhydride (Uniroyal Chemical Company, Middlebury, Conn.).

MEB Copolymer: maleated ethylene/butene copolymer

Antioxidant

Irganox B225: Phenolic/phosphite based antioxidant (Ciba Specialty Chemicals Corporation, Troy, Mich.).

Crosslinking Compounds 1,3-PBO: 1,3-phenylenebis2,2'-(oxazoline-2) (Tramaco Japan Ltd., Tokyo, Japan).

SP-1045: Alkylated phenol/formadehyde resole type resin (Schenectady International, Inc., Schenectady, N.Y.).

HVA-2: 2,4-bismaleimidotoluene (DuPont Dow Elastomers, Stow, Ohio).

Vulcup 40KE: 40 weight percent 1,4-bis-(t-butylperoxyisopropyl benzene) on silane modified clay (Harwick Chemical, Akron, Ohio).

What is claimed is:

1. A thermoplastic vulcanizate composition, comprising a blend of a thermoplastic polyurethane and a carboxylated nitrile rubber, said blend being at least partially cured by an addition type curing agent selected from the group consisting of oxazolines, oxazines, and imidazolines, wherein said agent does not cause the evolution of volatiles during the curing of said rubber.

2. A thermoplastic vulcanizate composition, according to claim 1, wherein said composition further includes a processing aid, the amount of said processing aid present in an amount from about 2 to about 20 parts by weight per 100 parts by weight of said thermoplastic polyurethane.

3. A thermoplastic vulcanizate composition according to claim 2, wherein the repeat groups containing carboxylic acid groups in said nitrile rubber are from about 1 to about 10 parts by weight based upon 100 parts by weight of the conjugated diene and the acrylonitrile repeat groups in said nitrile rubber.

4. A thermoplastic vulcanizate composition according to claim 3, wherein said processing aid is a polyethylene, polypropylene, ethylenepropylene rubber, EPDM rubber, or ethylene/1-olefin copolymer which material has grafted been with 1 to 6 weight percent of acrylic or methacrylic acid or 1 to 60 weight percent of styrene/acrylonitrile copolymer where acrylonitrile content can range from 5% to 95%.

5. A thermoplastic vulcanizate composition according to claim 2, wherein said processing aid is a maleated polyethylene, maleated polypropylene, maleated EP rubber, maleated ethylene/α-olefin copolymer, maleated styrene-ethylenelbutene-styrene triblock copolymer, or combinations thereof.

6. A thermoplastic vulcanizate composition according to claim 5, wherein said processing aid is maleated polyethylene and said curative is 1,3-phenylene-bis 2,2'-(oxazoline-2).

7. A thermoplastic vulcanizate composition according to claim 6, wherein said carboxylated nitrile rubber has been dynamically vulcanized and wherein the degree of cure is at least 80 percent.

8. A thermoplastic vulcanizate composition according to claim 1, wherein said composition is free of sulfur, peroxide, or phenolic resin curatives.

9. A thermoplastic vulcanizate composition according to claim 1, wherein the amount of said curative is from about 0.05 to about 12 parts by weight per 100 parts by weight of said carboxylated nitrile rubber, and wherein said curative is 2,2'-bis(oxazoline-2), 2,2'hexamethylenedicarbamoylbis (oxazoline-2), or 1,3-phenylene-bis 2,2'-(oxazoline-2), or combinations thereof.

10. A thermoplastic vulcanizate composition according to claim 9, wherein the amount of said nitrile rubber is from about 50 to about 500 parts by weight per 100 parts by weight of said thermoplastic polyurethane.

11. A process for preparing a thermoplastic vulcanizate composition comprising:
dynamically vulcanizing a carboxylated nitrile rubber in the presence of a thermoplastic polyurethane, a processing aid, and an addition type curing agent selected from the group consisting of oxazolines, oxazines, and imidazolines, wherein said agent does not cause the evolution of volatiles during the curing of said rubber.

12. A process according to claim 11, wherein said processing aid is a maleated polyethylene, maleated polypropylene, maleated ethylene-propylene rubber, maleated ethylene/α-olefin copolymer, or combinations thereof, and wherein the amount of said processing aid is from about 2 to about 20 parts by weight per 100 parts by weight of said thermo-plastic polyurethane.

13. A process according to claim 12, wherein the amount of said curative is from about 0.05 to about 12 parts by weight per 100 parts by weight of said carboxylated nitrile rubber, wherein said curative is 2,2'-bis(oxazoline-2), 2,2'hexamethylenedicarbamoylbis(oxazoline-2), and 1,3-phenylene-bis 2,2'-(oxazoline-2), or combinations thereof, and wherein said composition is free of sulfur, peroxide or phenolic resin curatives.

14. A process according to claim 13, wherein the amount of said nitrile rubber is from about 50 to about 500 parts by weight per 100 parts by weight of said thermoplastic polyurethane.

15. A process according to claim 14, wherein said carboxylated nitrile rubber is at least 80 percent crosslinked.

16. A process according to claim 11, wherein said processing aid is a polyethylene, polypropylene, ethylene-propylene rubber, EPDM rubber, or ethylene/1-olefin copolymer which material has been grafted with 1 to 6 weight percent of acrylic or methacrylic acid or 1 to 60 weight percent of styrene/acrylonitrile copolymer where acrylonitrile content can range from 5% to 95%.

* * * * *